US012769420B2

(12) United States Patent
Chen et al.

(10) Patent No.: US 12,769,420 B2
(45) Date of Patent: Oct. 20, 2026

(54) TOUCH DEVICE AND TOUCH METHOD

(71) Applicant: ASUSTEK COMPUTER INC., Taipei (TW)

(72) Inventors: Ya-Ting Chen, Taipei (TW); Hung-Yi Lin, Taipei (TW); Hao-Ping Lin, Taipei (TW); Wen-Hsiang Lee, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 18/819,760

(22) Filed: Aug. 29, 2024

(65) Prior Publication Data

US 2025/0348168 A1 Nov. 13, 2025

(30) Foreign Application Priority Data

May 13, 2024 (TW) ................................ 113117609

(51) Int. Cl.

*G06F 3/041* (2006.01)
*G06F 3/0354* (2013.01)
*G06F 3/038* (2013.01)
*G06F 3/044* (2006.01)

(52) U.S. Cl.

CPC ...... *G06F 3/04166* (2019.05); *G06F 3/03547* (2013.01); *G06F 3/038* (2013.01); *G06F 3/044* (2013.01)

(58) Field of Classification Search

CPC .. G06F 3/04166; G06F 3/03547; G06F 3/038; G06F 3/044

See application file for complete search history.

(56) References Cited

U.S. PATENT DOCUMENTS 11,630,573 B1 4/2023 Lin
2011/0279397 A1* 11/2011 Rimon .................... G06F 3/048 345/173
2015/0009136 A1* 1/2015 Kato ....................... G06F 3/044 345/157

(Continued)

FOREIGN PATENT DOCUMENTS

CN 104461105 A 3/2015
CN 108399043 B 5/2021

(Continued)

*Primary Examiner* — Hong Zhou
(74) *Attorney, Agent, or Firm* — MUNCY, GEISSLER, OLDS & LOWE, P.C.

(57) ABSTRACT

A touch device is provided, including a touch pad, a screen, a control unit, and a processing unit. The touch pad is adapted to perform hover detection and touch detection on an object. The screen is adapted to display an operating interface. The control unit is configured to: determine that the object is currently in a hover state or a touch state; output hover detection information when the object is currently in the hover state; and output touch detection information when the object is currently in the touch state. The processing unit is electrically coupled to the control unit and the screen, and configured to generate a position labeling pattern based on the hover detection information and display the position labeling pattern on the operating interface, and generate a touch input instruction adapted to control the operating interface based on the touch detection information. A touch method is further provided.

13 Claims, 8 Drawing Sheets

(56) References Cited

U.S. PATENT DOCUMENTS

| | | | | |
|---|---|---|---|---|
| 2015/0077339 | A1* | 3/2015 | Kato | G06F 3/0418 345/157 |
| 2015/0091862 | A1* | 4/2015 | Bertrand | G06F 3/0446 345/174 |
| 2016/0202840 | A1* | 7/2016 | Ichihara | G06F 3/0488 345/174 |
| 2017/0097723 | A1* | 4/2017 | Ogawa | G02F 1/13338 |
| 2021/0011604 | A1* | 1/2021 | Yoganandan | G06F 3/044 |
| 2023/0168800 | A1* | 6/2023 | Sugiyama | G06F 3/044 345/174 |

FOREIGN PATENT DOCUMENTS

| | | | |
|---|---|---|---|
| CN | 113253876 | A | 8/2021 |
| TW | 202321894 | A | 6/2023 |

* cited by examiner

TOUCH DEVICE AND TOUCH METHOD

CROSS-REFERENCE TO RELATED APPLICATION

This application claims the priority benefit of Taiwan Application Serial No. 113117609, filed on May 13, 2024. The entirety of the above-mentioned patent application is hereby incorporated by reference herein and made a part of the specification.

BACKGROUND OF THE INVENTION

Field of the Invention

The disclosure relates to the field of touch control technologies, and in particular, to a touch device and a touch method.

Description of the Related Art

Conventionally, when a touch pad is used to perform a handwriting or drawing operation, because an input surface (namely, a surface of the touch pad) and a display surface are located at different positions, a user often cannot accurately control an input position on the input surface based on a presenting picture of the display surface during the operation. In other words, an alignment problem is easily generated between the input surface and the display surface, which affects smoothness of a touch operation performed by the user.

BRIEF SUMMARY OF THE INVENTION

The disclosure provides a touch device. The touch device includes a touch pad, a screen, a control unit, and a processing unit. The touch pad is adapted to perform hover detection and touch detection on an object above/on the touch pad. The screen is adapted to display an operating interface. The control unit is electrically coupled to the touch pad, and configured to: determine that the object is currently in a hover state or a touch state; output hover detection information when it is determined that the object is currently in the hover state; and output touch detection information when it is determined that the object is currently in the touch state. The processing unit is electrically coupled to the control unit and the screen, and configured to generate a position labeling pattern based on the hover detection information and display the position labeling pattern on the operating interface, and generate a touch input instruction adapted to control the operating interface based on the touch detection information.

The disclosure further provides a touch method, applicable to a touch device, where the touch device includes a touch pad and a screen, where the touch pad is adapted to perform hover detection and touch detection on an object above/on the touch pad, and the screen is adapted to display an operating interface. The touch method includes: determining that the object is currently in a hover state or a touch state; outputting hover detection information when it is determined that the object is currently in the hover state, and generating a position labeling pattern based on the hover detection information and displaying the position labeling pattern on the operating interface; and outputting touch detection information when it is determined that the object is currently in the touch state; and generating a touch input instruction adapted to control the operating interface based on the touch detection information.

According to a touch device and a touch method provided in the disclosure, hover detection and touch detection are performed on an object above/on a touch pad (namely, an input surface), and when it is determined that the object is in a hover state, a position labeling pattern is presented on a screen (namely, a display surface). In this way, a user accurately controls an input position on the input surface based on a presenting picture of the display surface, thereby avoiding generating an alignment problem between the input surface and the display surface. In addition, smoothness of a touch control operation performed by the user can be improved.

DETAILED DESCRIPTION OF THE EMBODIMENTS

Specific implementations of the disclosure are described in detail below with reference to schematic diagrams. Advantages and features of the disclosure are more apparent from the following descriptions and application patent scope. It should be noted that, the drawings are drawn by using an extremely simplified form and imprecise proportion, which are only used for conveniently and clearly assisting in explaining the objective of embodiments of the disclosure.

Figure 1:
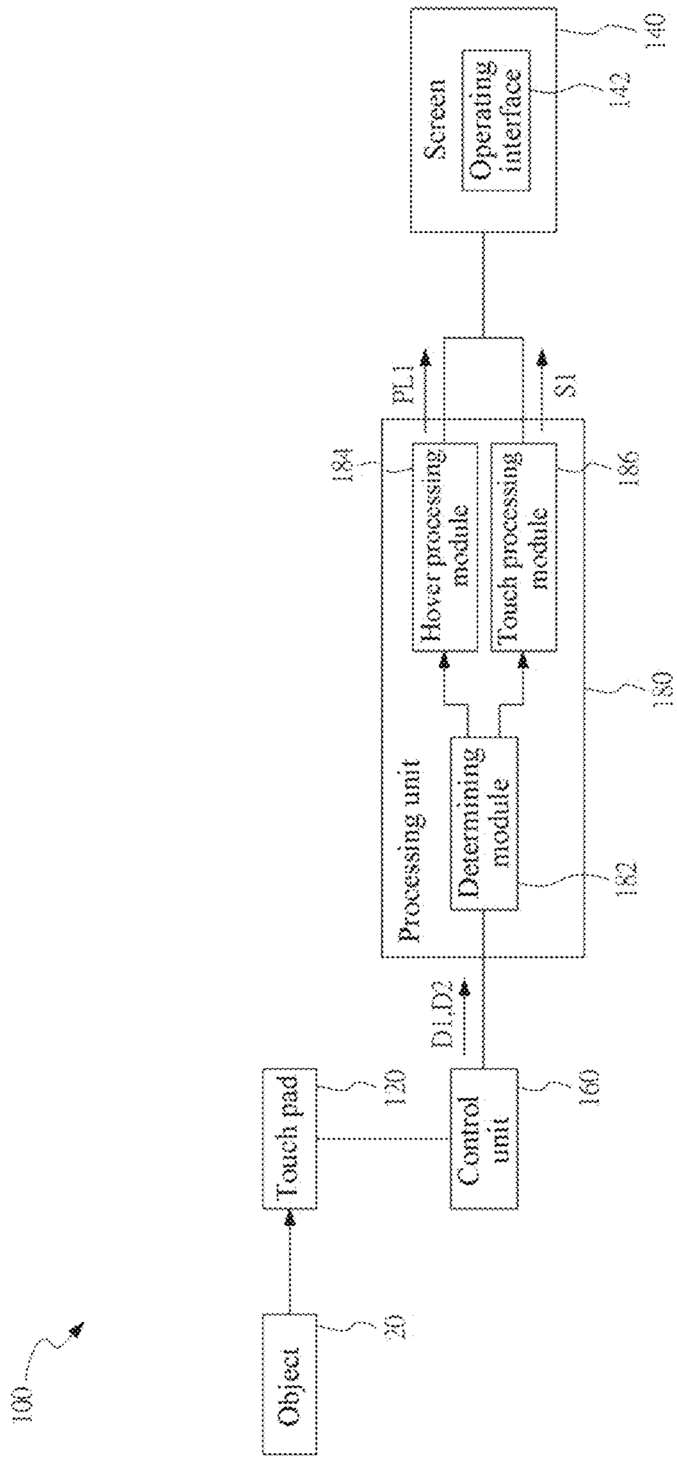
FIG. 1 is a schematic block diagram of a touch device according to an embodiment of the disclosure.

FIG. 1 is a schematic block diagram of a touch device 100 according to an embodiment of the disclosure. In an embodiment, the touch device 100 is a notebook computer or a combination of a touch control module and a display interface of the notebook computer. However, the disclosure is not limited thereto.

The touch device 100 includes a touch pad 120, a screen 140, a control unit 160, and a processing unit 180.

The touch pad 120 is adapted to perform hover detection and touch detection on an object 20 above/on the touch pad 120. In an embodiment, the object 20 is a finger, and the touch pad 120 is a capacitive touch pad 120 adapted to detect a position of the finger. In an embodiment, the touch pad 120 is adapted to be operated in a high-sensitivity detection mode or a normal detection mode. The high-sensitivity detection mode is that both hover detection and touch detection are performed on the object 20, and the normal detection mode is that only touch detection is performed on the object 20.

For the capacitive touch pad, the high-sensitivity detection mode or the normal detection mode is switched by adjusting a detection threshold of the touch pad 120. In an embodiment, two detection thresholds are set in the high-sensitivity detection mode, to distinguish between touch detection, hover detection, and being object-free; and a single detection threshold is set in the normal detection mode, to distinguish between having touch and being object-free. In other words, a determining condition of the high-sensitivity detection mode is different from a determining condition of the normal detection mode, and the most significant condition is to set the two detection thresholds.

The screen 140 is adapted to display an operating interface 142. In an embodiment, the operating interface 142 is a drawing operating interface, a handwriting input operating interface, or the like.

The control unit 160 is electrically coupled to the touch pad 120, and configured to determine that the object 20 is in a hover state or a touch state. In an embodiment, the control unit 160 is a microcontroller.

In an embodiment, the control unit 160 determines that the object 20 is in the hover state or the touch state based on a capacitance change detected on the touch pad 120.

For a mutual capacitance touch pad, when the finger approaches the touch pad 120, the touch pad 120 detects a capacitance change. Compared with the hover state, there is a more drastic capacitance change when the finger touches the touch pad 120. Through detection of the capacitance change, it is determined that the object 20 is in the hover state or the touch state, and a position of the object 20 is determined.

Figure 2:
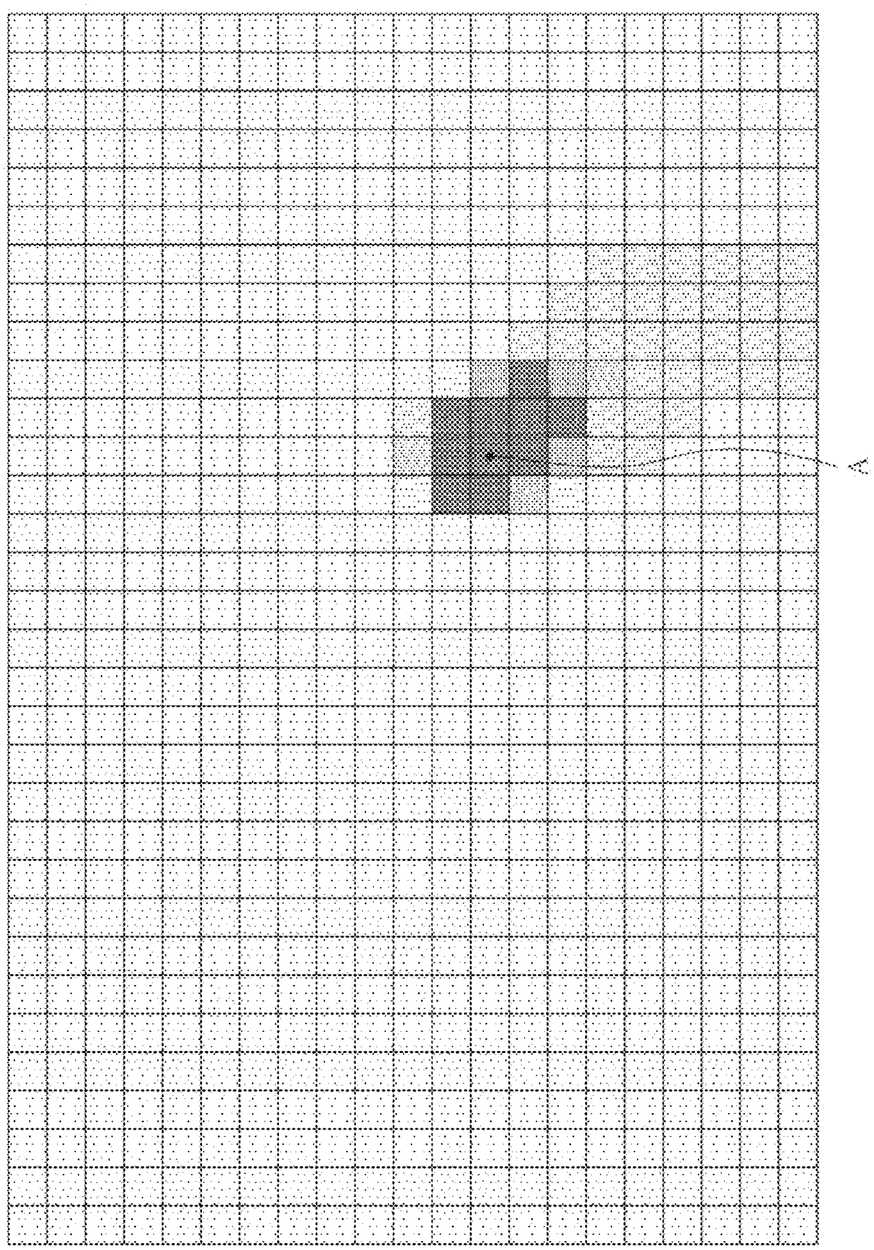
FIG. 2 is a schematic diagram in which a touch pad detects that an object is in a touch state.
Figure 3:
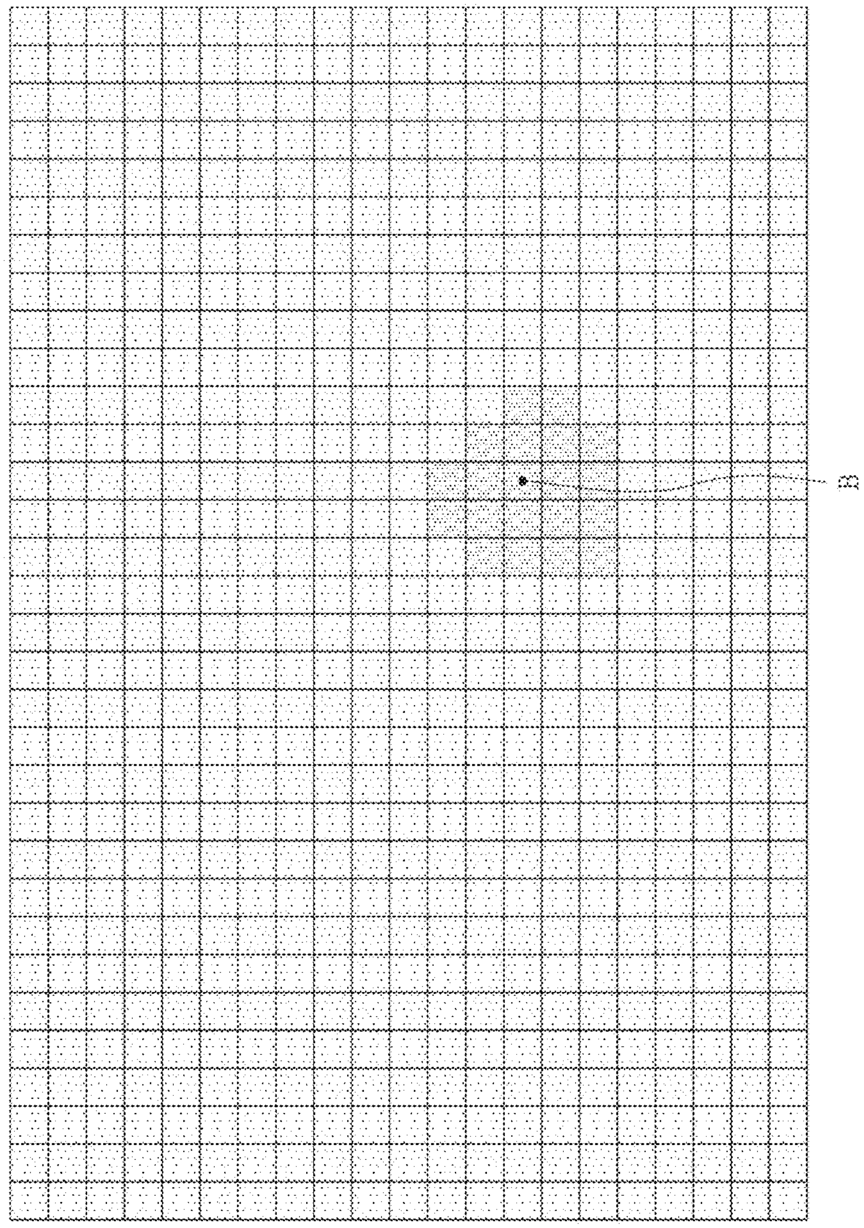
FIG. 3 is a schematic diagram in which a touch pad detects that an object is in a hover state.

Referring to FIG. 2 and FIG. 3, FIG. 2 is a schematic diagram in which the touch pad 120 detects that the object 20 is in the touch state, and FIG. 3 is a schematic diagram in which the touch pad 120 detects that the object 20 is in the hover state. Each grid in the figure corresponds to a sensing element. In the figure, capacitance change values are represented by different filling patterns. As shown in the figure, there are capacitance changes both around a sensing position A in FIG. 2 and around a sensing position B in FIG. 3. However, compared with around the sensing position B in FIG. 3, capacitance change values around the sensing position A in FIG. 2 have a more drastic change.

Specifically, a touch threshold and a hover threshold are set for the touch state and the hover state. When there is any sensing element on the touch pad 120, and a capacitance change value detected by the sensing element is greater than the touch threshold, it is determined that the object 20 is in the touch state. The position of the object 20 is determined by a peak value of such capacitance change values. In other words, a position of a sensing element corresponding to the peak value is determined as a touch position of the object 20.

When capacitance change values detected by all sensing elements on the touch pad 120 are all less than the touch threshold, but there is a capacitance change value detected by at least one sensing element greater than the hover threshold, in this case, it is determined that the object 20 is in the touch state. The position of the object 20 is also determined by a peak value of such capacitance change values. In other words, a position of a sensing element corresponding to the peak value is determined as a hover position of the object 20. When capacitance change values detected by all sensing elements on the touch pad 120 are all less than the hover threshold, it is determined that this is an object-free state.

When it is determined that the object 20 is in the hover state, the control unit 160 outputs hover detection information D1. When it is determined that the object 20 is in the touch state, the control unit 160 outputs touch detection information D2. In an embodiment, the hover detection information D1 includes two-dimensional coordinate information corresponding to the position of the object. The touch detection information D2 also includes two-dimensional coordinate information corresponding to the position of the object. However, the disclosure is not limited thereto.

In an embodiment, a distance sensor is arranged on the touch pad 120, such as a self-capacitance touch sensor, to detect a distance between the object 20 and a touch surface of the touch pad 120, namely, a height of the object 20 above the touch surface of the touch pad 120. In this case, in addition to the two-dimensional coordinate information corresponding to the position of the object, the hover detection information D1 further includes height information.

The processing unit 180 is electrically coupled to the control unit 160 and the screen 140. The processing unit 180 includes a determining module 182, a hover processing module 184, and a touch processing module 186.

First, after receiving detection information from the control unit 160, the determining module 182 of the processing unit 180 determines that the detection information output by the control unit 160 is the touch detection information D2 or the hover detection information D1. In an embodiment, the determining module 182 determines that the detection information output by the control unit 160 is the touch detection information D2 or the hover detection information D1 based on an information type included in the detection information. In an embodiment, the detection information output by the control unit 160 includes a type of data, so that the determining module 182 determines that the detection information output by the control unit 160 is the touch detection information D2 or the hover detection information D1.

When it is determined that the processing unit 180 receives the touch detection information D2, the touch processing module 186 of the processing unit 180 generates a touch input instruction S1 adapted to control the operating interface 142 based on the touch detection information D2, to control the operating interface 142 to perform a corresponding operation. In an embodiment, the operating interface 142 is the drawing operating interface, and the touch input instruction S1 is a brush track signal, an eraser track signal, or the like.

When it is determined that the processing unit 180 receives the hover detection information D1, the hover processing module 184 of the processing unit 180 generates a position labeling pattern PL1 based on the hover detection information D1 and displays the position labeling pattern on the operating interface 142.

In an embodiment, when the hover detection information D1 includes the height information, and the hover processing module 184 of the processing unit 180 receives a hover detection signal, a size or a color of the position labeling pattern PL1 is further adjusted based on the height information. In other words, the size or the color of the position labeling pattern PL1 displayed on the operating interface 142 is associated with the height information.

Figure 4A:
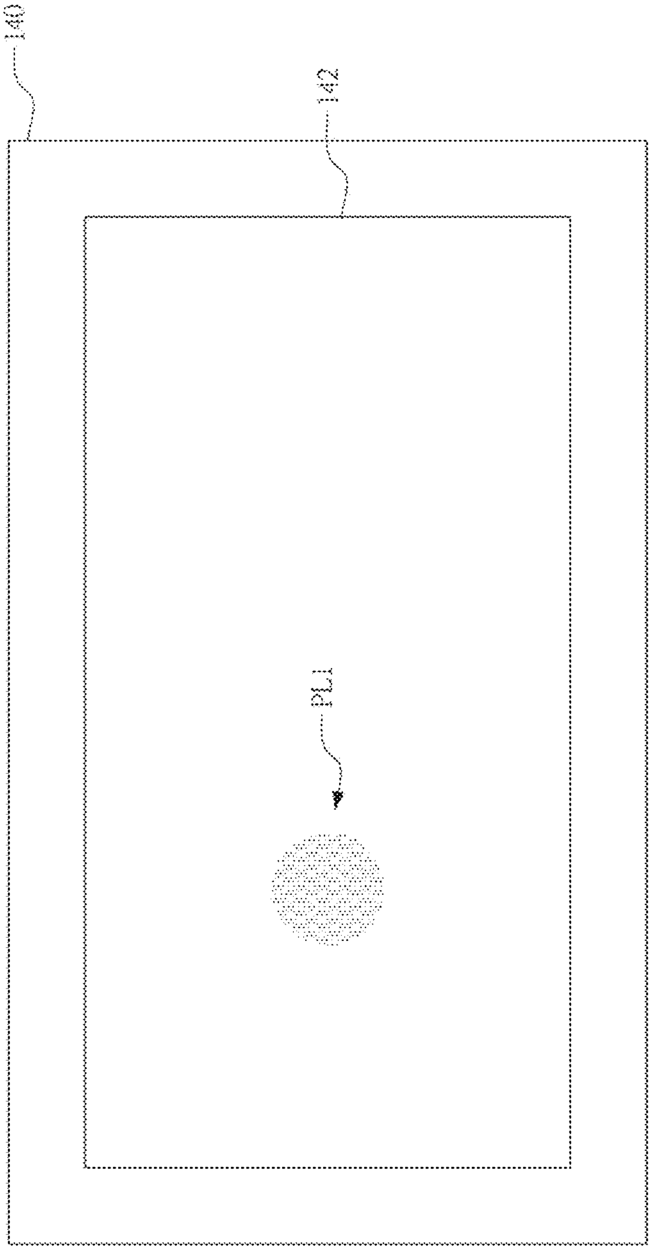
FIG. 4A and FIG. 4B show an embodiment of the disclosure in which a position labeling pattern on an operating interface is changed based on hover detection information.
Figure 4B:
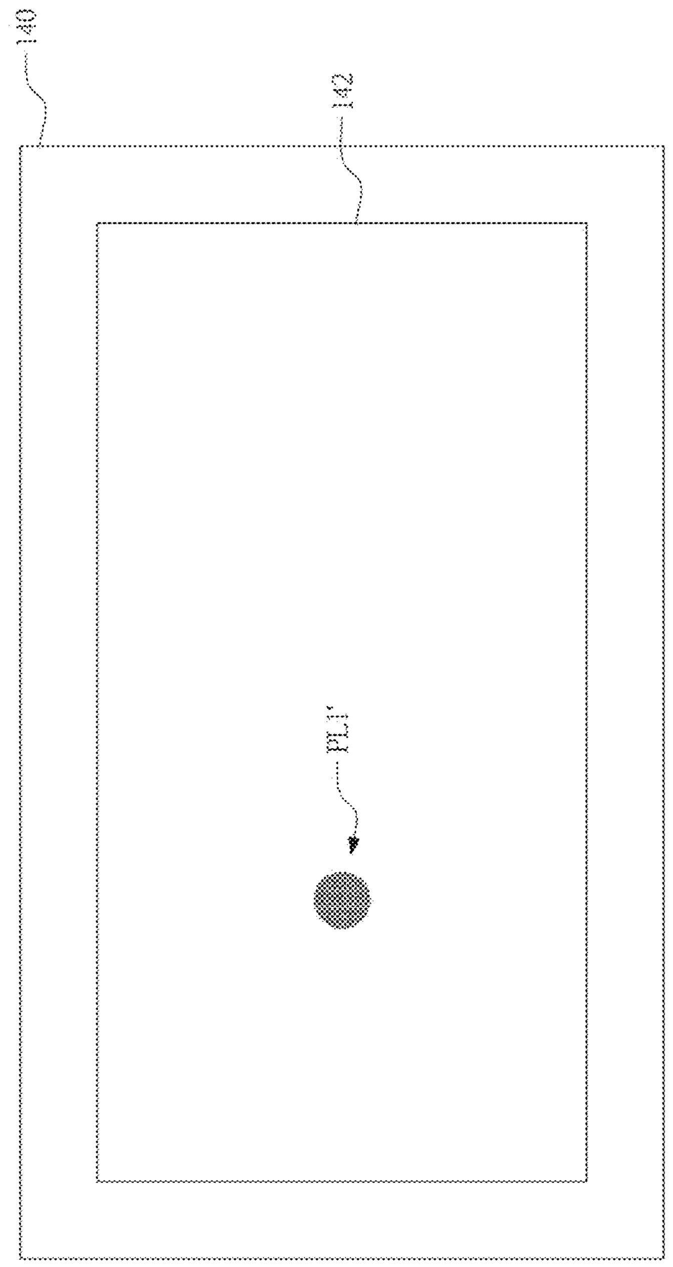

In an embodiment, referring to FIG. 4A and FIG. 4B, FIG. 4A and FIG. 4B show an embodiment of the disclosure in which position labeling patterns PL1 and PL1' on the operating interface 142 are changed based on the hover detection information D1.

As shown in FIG. 4A, when the height information displays that the distance between the object 20 and the touch surface of the touch pad 120 is long, a position labeling pattern PL1 with a large size is presented on the operating interface 142. As shown in FIG. 4B, when the height information displays that the distance between the object 20 and the touch surface of the touch pad 120 is short, a position labeling pattern PL1' with a small size is presented on the operating interface 142. In an embodiment, the position labeling patterns PL1 and PL1' are circular patterns. However, the disclosure is not limited thereto. In other embodiments, the position labeling patterns PL1 and PL1' are also cross patterns, square patterns, or the like. Further, in an embodiment, when the height information displays that the distance between the object 20 and the touch surface of the touch pad 120 is short, a position labeling pattern PL1' with a small size and a dark color is presented on the operating interface 142.

Figure 5:
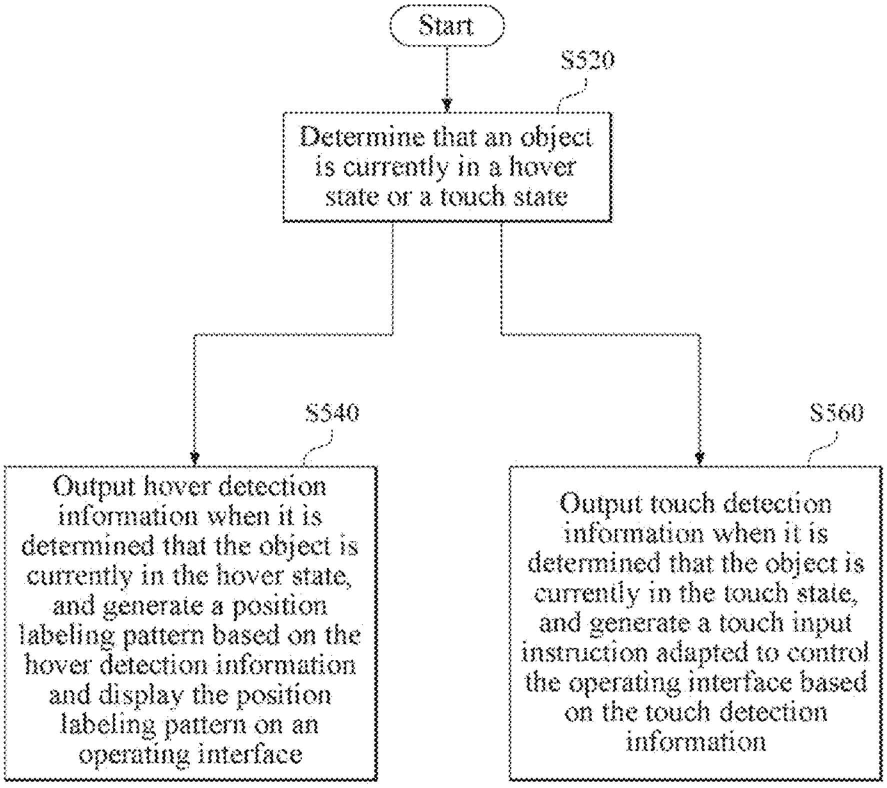
FIG. 5 is a flowchart of a touch method according to an embodiment of the disclosure.

FIG. 5 is a flowchart of a touch method according to an embodiment of the disclosure.

The touch method is applicable to the touch device 100 as shown in FIG. 1. The touch method includes the following steps.

First, as shown in step S520, it is determined that an object 20 is currently in a hover state or a touch state.

When it is determined that the object 20 is currently in the hover state, the procedure proceeds to step S540, to output hover detection information D1, and generate a position labeling pattern PL1 based on the hover detection information D1 and display the position labeling pattern PL1 on an operating interface 142.

When it is determined that the object 20 is currently in the touch state, the procedure proceeds to step S560, to output touch detection information D2, and generate a touch input instruction S1 adapted to control the operating interface 142 based on the touch detection information D2.

Figure 6:
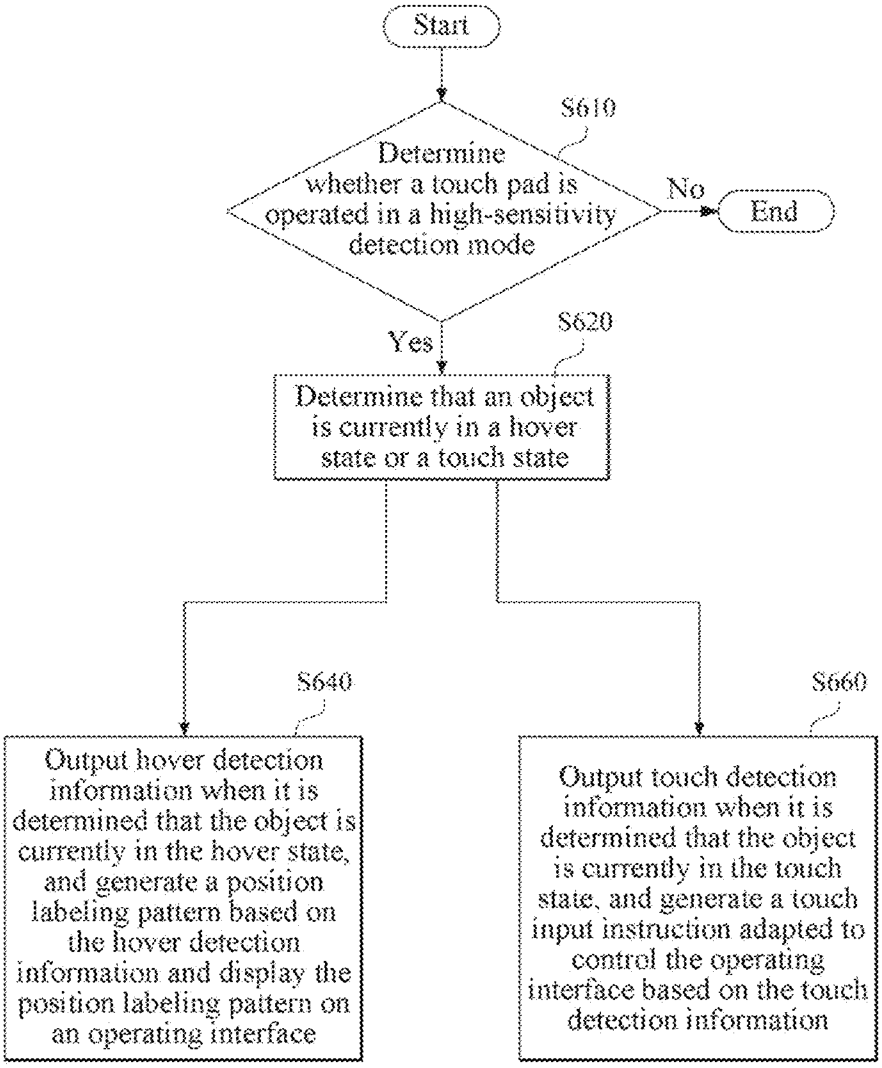
FIG. 6 is a flowchart of a touch method according to another embodiment of the disclosure.

FIG. 6 is a flowchart of a touch method according to another embodiment of the disclosure.

The touch method is applicable to the touch device 100 as shown in FIG. 1 that is adapted to be operated in a high-sensitivity detection mode or a normal detection mode. The touch method includes the following steps.

First, as shown in determining step S610, it is determined whether the touch pad 120 is operated in the high-sensitivity detection mode.

When the touch pad 120 is operated in the high-sensitivity detection mode, the procedure proceeds to step S620, to determine that an object 20 is currently in a hover state or a touch state. When the touch pad 120 is not operated in the high-sensitivity detection mode, the procedure ends.

When it is determined that the object 20 is currently in the hover state, the procedure proceeds to step S640, to output hover detection information D1, and generate a position labeling pattern PL1 based on the hover detection information D1 and display the position labeling pattern PL1 on an operating interface 142.

When it is determined that the object 20 is currently in the touch state, the procedure proceeds to step S660, to output touch detection information D2, and generate a touch input instruction S1 adapted to control the operating interface 142 based on the touch detection information D2.

Figure 7:
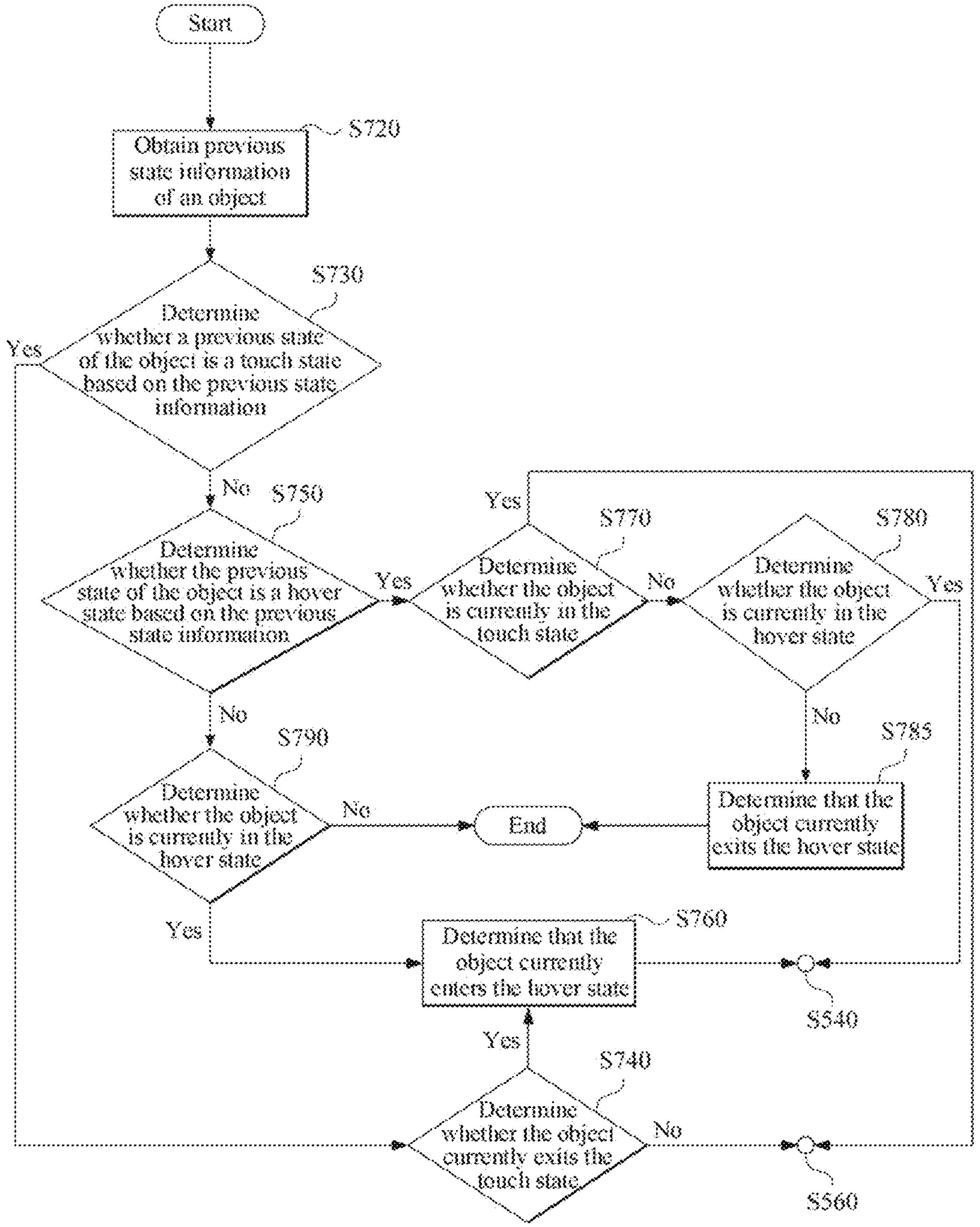
FIG. 7 shows an embodiment of a determining procedure of step S520 of determining that an object is in a hover state or a touch state in FIG. 5.

FIG. 7 shows an embodiment of a determining procedure of step S520 of determining that an object 20 is in a hover state or a touch state in FIG. 5.

First, as described in step S720, previous state information of the object 20 is obtained. The previous state information is information-free, hover detection information D1, or touch detection information D2. A previous state corresponding to the previous state information is an object-free state, a touch state, or a hover state.

Then, as described in determining step S730, it is determined whether the previous state of the object 20 is the touch state based on the previous state information.

When the previous state is the touch state, the procedure proceeds to step S740. When the previous state is not the touch state, the procedure proceeds to determining step S750, to determine whether the previous state of the object 20 is the hover state based on the previous state information.

When the previous state is the touch state, as described in step S740, it is determined whether the object 20 currently exits the touch state. When it is determined that the object 20 currently does not exit the touch state, in other words, the object 20 is still in the touch state, the procedure proceeds to step S560. When it is determined that the object 20 exits the touch state, the procedure proceeds to step S760, to determine that the object 20 currently enters the hover state, and proceed to step S540.

When a determining result of determining step S750 displays that the previous state is the hover state, the procedure proceeds to determining step S770, to determine whether the object 20 is currently in the touch state.

When a determining result of determining step S770 determines that the object 20 is currently in the touch state, in other words, the object 20 enters the touch state from the hover state, the procedure proceeds to step S560. When it is determined that the object 20 is currently not in the touch state, the procedure proceeds to determining step S780, to further determine whether the object 20 is currently in the hover state. When it is determined that the object 20 is currently in the hover state, the procedure proceeds to step S540. When it is determined that the object 20 is currently not in the hover state, the procedure proceeds to step S785, to determine that the object 20 currently exits the hover state, and then the procedure ends.

When the determining result of determining step S750 displays that the previous state of the object 20 is not the hover state, it indicates that the previous state of the object 20 is the object-free state. When the previous state of the object 20 is the object-free state, as described in determining step S790, it is determined whether the object 20 is currently in the hover state. When it is determined that the object 20 is currently not in the hover state, the procedure ends. When it is determined that the object 20 is currently in the hover state, the procedure proceeds to step S760, to determine that the object 20 currently enters the hover state, and proceed to step S540.

In summary, according to a touch device 100 and a touch method provided in the disclosure, hover detection and touch detection are performed on an object 20 above/on a touch pad 120 (namely, an input surface), and when it is determined that the object 20 is in a hover state, a position labeling pattern PL1 is presented on a screen 140 (namely, a display surface). In this way, a user accurately controls an input position on the input surface based on a presenting picture of the display surface, thereby avoiding generating an alignment problem between the input surface and the display surface. In addition, smoothness of a touch control operation performed by the user can be improved.

The foregoing are only preferred embodiments of the disclosure, and do not impose any limitation on the disclosure. A person skilled in the art makes any form of equivalent substitutions, modifications, or other changes to the technical means and technical content disclosed in the disclosure without departing from a scope of the technical means of the disclosure, and all the substitutions, modifications, or other changes do not depart from the content of the technical means of the disclosure, and still fall within the scope of protection of the disclosure.

What is claimed is:

1. A touch device, comprising:

a touch pad, adapted to perform hover detection and touch detection on an object above/on the touch pad;

a screen, adapted to display an operating interface;

a control unit, electrically coupled to the touch pad, and configured to:

determine that the object is currently in a hover state or a touch state;

output hover detection information when it is determined that the object is currently in the hover state; and output touch detection information when it is determined that the object is currently in the touch state; and a processing unit, electrically coupled to the control unit and the screen, and configured to generate a position labeling pattern based on the hover detection information and display the position labeling pattern on the operating interface, and generate a touch input instruction adapted to control the operating interface based on the touch detection information, wherein the touch pad comprises a plurality of sensing elements, wherein when a capacitance change value of one of the plurality of sensing elements with respective to its neighboring sensing elements is greater than a touch threshold, it is determined that the object is in the touch state, wherein when a plurality of capacitance change values detected by the plurality of sensing elements are all less than the touch threshold, but one of the plurality of capacitance change values detected by at least one of the plurality of sensing elements is greater than a hover threshold, it is determined that the object is in the hover state, wherein a color of the position labeling pattern is associated with height information, and wherein when the control unit determines that a previous state of the object is the hover state based on previous state information, the control unit determines that the object currently exits the hover state when it is detected that the object is currently neither in the touch state nor in the hover state.

2. The touch device according to claim 1, wherein the hover detection information comprises two-dimensional coordinate information and height information.

3. The touch device according to claim 2, wherein a size of the position labeling pattern is associated with the height information.

4. The touch device according to claim 1, wherein the touch detection information comprises two-dimensional coordinate information.

5. The touch device according to claim 1, wherein the touch pad is adapted to be operated in a high-sensitivity detection mode or a normal detection mode, wherein the high-sensitivity detection mode is that both hover detection and touch detection are performed on the object, and the normal detection mode is that only touch detection is performed on the object.

6. The touch device according to claim 1, wherein the object is a finger.

7. The touch device according to claim 1, wherein the touch pad is a capacitive touch pad.

8. A touch method, applicable to a touch device, wherein the touch device comprises a touch pad and a screen, the touch pad is adapted to perform hover detection and touch detection on an object above/on the touch pad, and the screen is adapted to display an operating interface; and the touch method comprises:

determining that the object is currently in a hover state or a touch state;

outputting hover detection information when it is determined that the object is currently in the hover state, and generating a position labeling pattern based on the hover detection information and displaying the position labeling pattern on the operating interface; and outputting touch detection information when it is determined that the object is currently in the touch state, and generating a touch input instruction adapted to control the operating interface based on the touch detection information, wherein the touch pad comprises a plurality of sensing elements, wherein the touch method further comprises: detecting a plurality of capacitance change values by one of the plurality of sensing elements, when one of the plurality of capacitance change values detected by the one of the plurality of sensing elements with respective to its neighboring sensing elements is greater than a touch threshold, determining that the object is in the touch state, and when the plurality of capacitance change values are all less than the touch threshold, but one of the plurality of capacitance change values is greater than a hover threshold, determining that the object is in the hover state, wherein a color of the position labeling pattern is associated with height information, and wherein when a control unit determines that a previous state of the object is the hover state based on previous state information, the control unit determines that the object currently exits the hover state when it is detected that the object is currently neither in the touch state nor in the hover state.

9. The touch method according to claim 8, wherein the touch pad is adapted to be operated in a high-sensitivity detection mode or a normal detection mode, wherein the high-sensitivity detection mode is that both hover detection and touch detection are performed on the object, and the normal detection mode is that only touch detection is performed on the object.

10. The touch method according to claim 9, further comprising: determining whether the touch pad is operated in the high-sensitivity detection mode.

11. The touch method according to claim 8, wherein the step of determining that the object is currently in the hover state or the touch state comprises:

obtaining previous state information of the object;

determining a previous state of the object based on the previous state information; and determining, when the previous state is the hover state, whether the object currently enters the touch state, and further determining, when it is determined that the object currently does not enter the touch state, whether the object is currently in the hover state.

12. The touch method according to claim 8, wherein the step of determining that the object is currently in the hover state or the touch state comprises:

obtaining previous state information of the object;

determining a previous state of the object based on the previous state information; and determining, when the previous state is the touch state, whether the object currently exits the touch state, and determining, when it is determined that the object currently exits the touch state, that the object is currently in the hover state.

13. The touch method according to claim 8, wherein the step of determining that the object is currently in the hover state or the touch state comprises:

obtaining previous state information of the object;

determining a previous state of the object based on the previous state information; and determining, when the previous state is an object-free state, whether the object is currently in the hover state.

* * * * *